Dec. 13, 1949     E. J. MARTIN ET AL     2,491,192
SEALED HEAT RAY DETECTOR

Filed Nov. 11, 1944     2 Sheets-Sheet 1

Inventors
Edward J. Martin &
Gifford G. Scott
By Blackmor, Spencer & Oliver
Attorneys

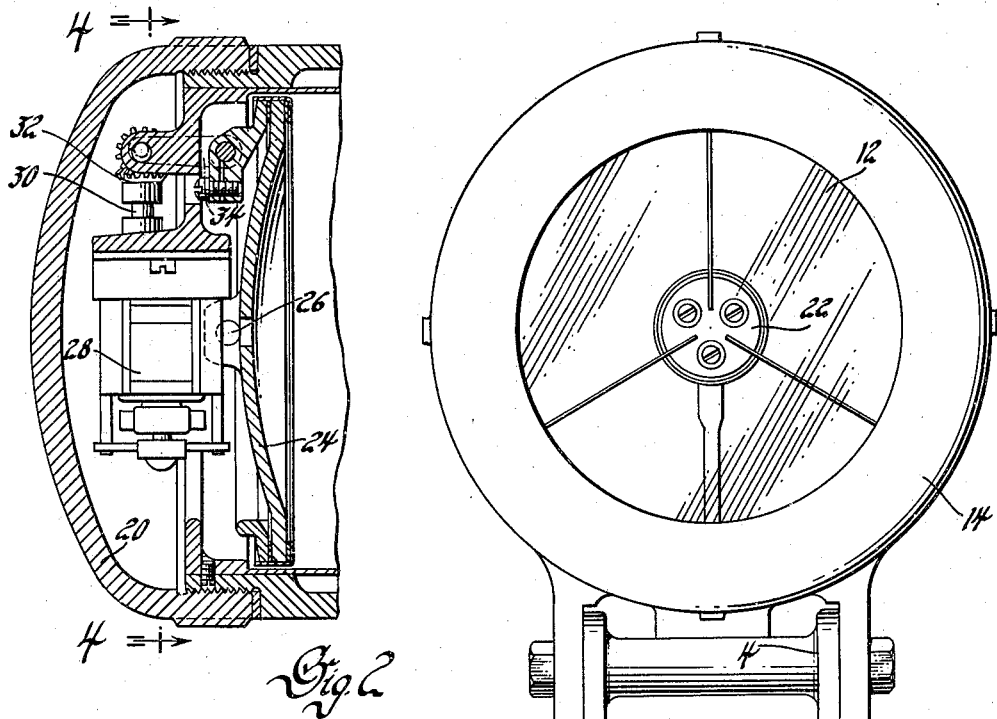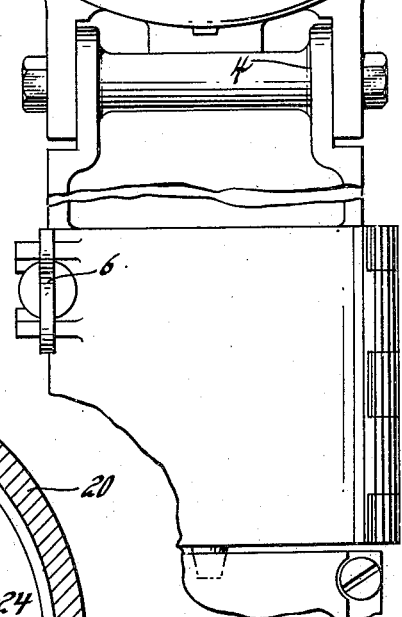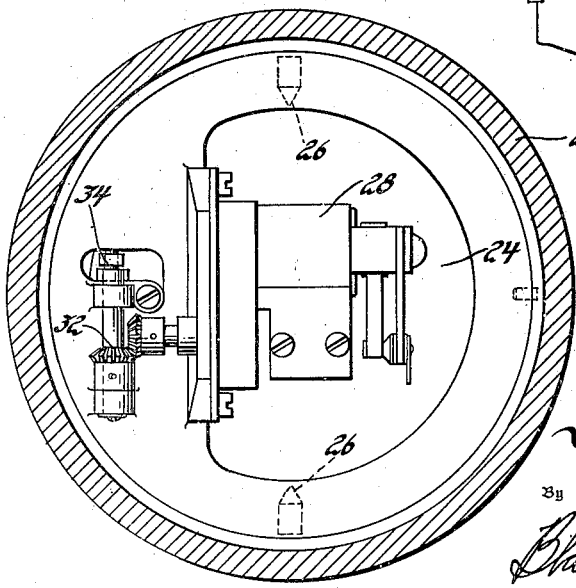

Patented Dec. 13, 1949

2,491,192

UNITED STATES PATENT OFFICE 2,491,192

SEALED HEAT RAY DETECTOR

Edward J. Martin, Pleasant Ridge, and Gifford G. Scott, Detroit, Mich., assignors to General Motors Corporation, Detroit, Mich., a corporation of Delaware Application November 11, 1944, Serial No. 562,944

3 Claims. (Cl. 250—83.3)

1

This invention relates to detecting means and more particularly to detecting means operated by rays of the infra-red band which are hermetically sealed and submersible.

It is, of course, a well-known physical fact that various objects emit rays in different bands of the spectrum and that most movable objects emit infra-red or heat rays by which the geographical location or position of the same may be found. This general system is the subject matter of a copending application in the names of W. E. Sargeant and H. B. Hoeper, Serial No. 442,572, filed May 11, 1942 and issued January 7, 1947 as Patent 2,413,788 entitled Heat detector and assigned to a common assignee. However, a device of this order would be very useful over water since a ship would emanate heat rays or infra-red rays which could be picked up or detected by such above defined detecting apparatus within a given range.

It is also well-known that light fog does not interpose a shield for these rays and that objects can be located through fog or bad weather when not visible. If, therefore, a device of this kind was positioned to scan the horizon when incoming rays impinged upon the detector, an indication would be obtained. This makes the device very useful for submarine use and in order to provide such detection without the submarine surfacing, it is desirable to locate such equipment upon the periscope so that it may be projected only a slight distance above the surface and be utilized for objection location without the submarine coming up. For such use it is necessary to provide a sealed or water-tight housing for an infra-red detector and it is, therefore, an object of our invention to provide such housing.

It is a further object of our invention to provide means for mounting the detector on the periscope of a submarine.

It is a further object of our invention to provide means for slightly modulating the incoming signal.

With these and other objects in view which will become apparent as the specification proceeds, our invention is best understood by reference to the following specification and claims and the illustrations in the accompanying drawings, in which:

Fig. 2 is a sectional view taken on line 2—2 of Fig. 1.

Fig. 3 is a front elevation of the housing of our invention, and

2

Figure 1:
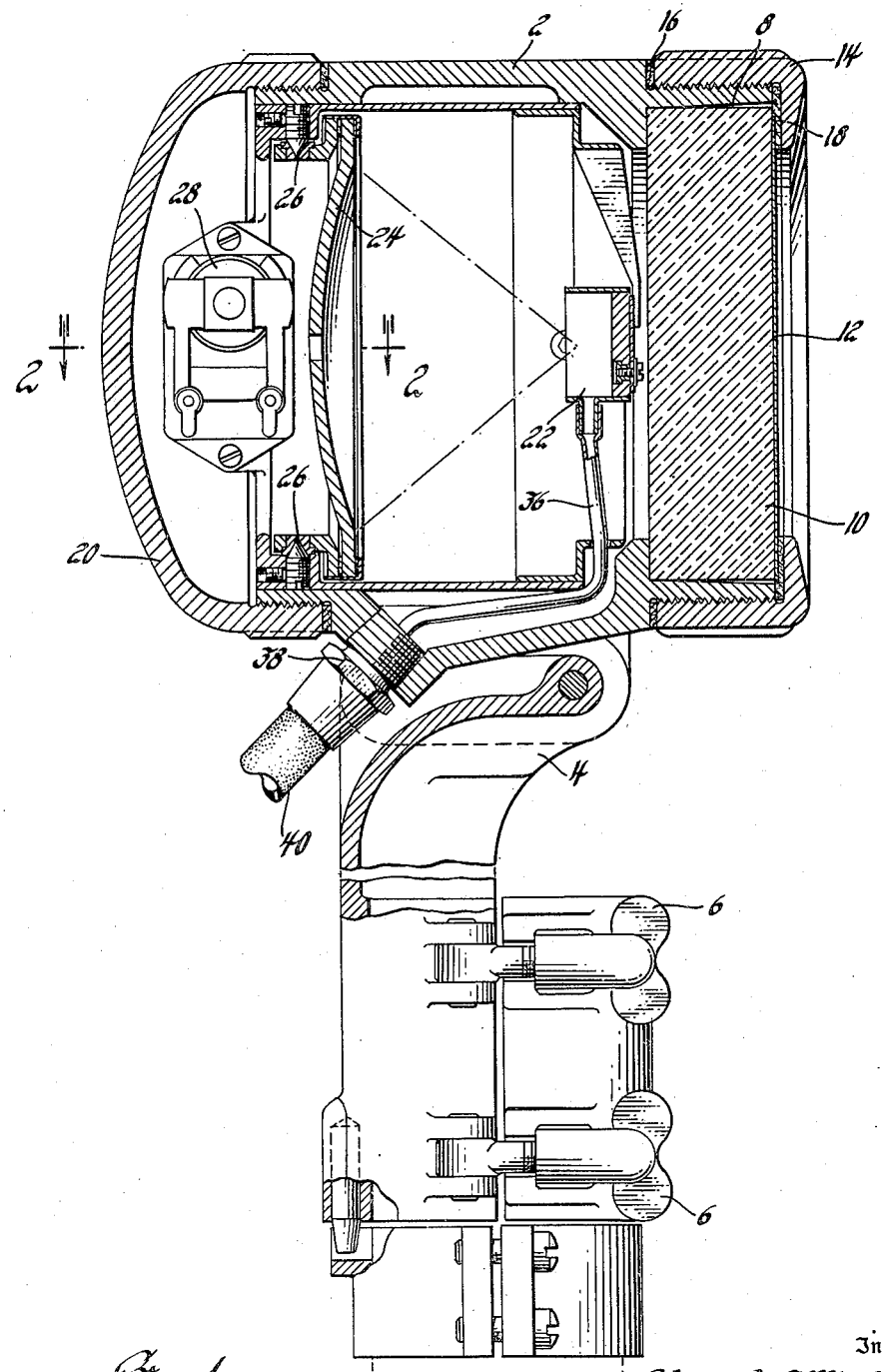
Fig. 1 is a vertical section taken through a housing embodying our invention.

Fig. 4 is a sectional view taken on line 4—4 of Fig. 2.

Referring more specifically to the drawings, in Fig. 1 there is shown a central cylindrical housing member 2 having its two end portions externally threaded to support capping means. This central housing is mounted upon the upper end of a bracket 4 which is provided with clamping means 6 in the nature of C clamps and thumb screws to secure the housing to the upper end of a cylindrical pipe or hollow member such as a periscope. The forward end of the housing 2 is counterbored, as shown at 8, to support a large circular block 10 of rock salt or other suitable material which permits the infra-red rays to pass therethrough, but provides a suitable pressure withstanding window to keep the water from the housing when submerged. The rock salt would, however, disintegrate if allowed to come into direct contact with liquid and a thin sheet 12 of chlorinated rubber or similar waterproofing is applied to the exposed face to protect the rock salt from the water. Other substances than chlorinated rubber may, of course, be used. This is applied to the rock salt by a thin layer of rubber cement. A circular flanged ring 14 is then applied with suitable washers or packing 16 and 18 and is screwed down tightly to clamp the rock salt window in place.

The opposite end of the cylindrical housing 2 is enclosed by a single cap 20. There is thus provided a tightly closed water-proof housing within which the infra-red thermopile sensitive means 22 is located at the focus of a reflector 24. This reflector is pivoted on a vertical axis by pivots 26 so that the same may be slightly wobbled back and forth to maintain the incoming beam scanning over the detector. This modulating force is provided by a small motor 28 mounted within the cap 20 which drives a small shaft 30 and through suitable bevelled gearing 32 an eccentric arm 34 which is connected to the mirrored surface 24. Thus the mirror is at all times, during energization, slightly moved back and forth so that the focal point scans over the surface of the thermopile. The output or connections to the thermopile are made through cable 36 which is lead through a tight bushing 38 in the side of the housing 2 and thence into a water-proof cable 40 which leads down into the submarine.

In operation, the device is clamped rigidly to the top of the periscope and the submarine may then perform any of its usual maneuvers and when coming back to the surface the detector is the first portion to arise thereabove. By then maneuvering the submarine, the unit may scan the horizon and if any infra-red rays enter the detector, an indication will be obtained at the apparatus in the submarine and the operators will know that some ship or other object is at that particular point even through fog or at night.

We claim:

1. In detecting means, a housing having an opening in one face thereof, pivotal focusing means mounted in the housing, thermocouple means mounted at the focus of the focusing means, means to oscillate the focusing means to move the point of focus alternately on and off said thermocouple and sealing means pervious to incoming rays to which the thermocouple means is sensitive mounted in the open face to seal the same.

2. In detecting means, a housing having an opening in one face thereof, thermocouple means mounted within the housing sensitive to rays in the infra-red portion of the spectrum, a concave focusing reflector capable of being oscillated, located in said housing and adapted to receive energy through said opening, means for oscillating said focusing reflector to periodically focus it on said thermocouple, and closure means for the opening comprising rock salt coated with a surface impervious to liquid so that the infra-red rays may pass through to the thermocouple but the housing may be sealed to submerge in liquid.

3. In detecting means, voltage generating means sensitive to radiation within a predetermined portion of the spectrum, a hermetically sealed housing means therefor having an opening in one face thereof adjacent said voltage generating means and closure means therefor comprising means previous to the radiation, a concave focusing reflector capable of being oscillated located in said housing and adapted to receive energy through said opening, means for oscillating said focusing reflector to periodically focus it on said thermocouple.

EDWARD J. MARTIN.
GIFFORD G. SCOTT.

REFERENCES CITED

The following references are of record in the file of this patent:

UNITED STATES PATENTS

| Number | Name | Date |
|---|---|---|
| 1,760,383 | Thomas | May 27, 1930 |
| 1,876,272 | Bayer | Sept. 6, 1932 |
| 1,954,204 | Hayes | Apr. 10, 1934 |
| 2,109,235 | Kott | Feb. 22, 1938 |
| 2,115,578 | Hall | Apr. 26, 1938 |
| 2,125,113 | Kling | July 26, 1938 |
| 2,173,994 | Anderson | Sept. 26, 1939 |
| 2,332,154 | Lindsay | Oct. 19, 1943 |
| 2,334,475 | Claudet | Nov. 16, 1943 |
| 2,410,317 | Tolson | Oct. 29, 1946 |
| 2,422,971 | Kell | June 24, 1947 |